(12) United States Patent
Ishizuka et al.

(10) Patent No.: US 8,858,380 B2
(45) Date of Patent: Oct. 14, 2014

(54) SPEED REDUCTION DEVICE AND SERIES OF SPEED REDUCTION DEVICES

(75) Inventors: Masayuki Ishizuka, Yokosuka (JP); Ikuko Nonoyama, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 310 days.

(21) Appl. No.: 13/370,432

(22) Filed: Feb. 10, 2012

(65) Prior Publication Data
US 2012/0238390 A1 Sep. 20, 2012

(30) Foreign Application Priority Data
Mar. 16, 2011 (JP) .................................... 2011-58444

(51) Int. Cl.
*F16H 57/04* (2010.01)
*F16H 57/02* (2012.01)
*F16H 57/027* (2012.01)
*F16H 1/32* (2006.01)

(52) U.S. Cl.
CPC .......... *F16H 57/027* (2013.01); *F16H 57/0486* (2013.01); *F16H 57/0445* (2013.01); *F16H 2001/325* (2013.01); *F16H 57/0471* (2013.01)
USPC ........... 475/159; 475/160; 475/214; 475/165; 74/606 R; 74/606 A; 74/25; 184/6.12

(58) Field of Classification Search
CPC ......... F16H 57/02; F16H 57/03; F16H 57/04; F16H 57/05
USPC ................................................. 475/159, 160
See application file for complete search history.

(56) References Cited

U.S. PATENT DOCUMENTS

| 2,378,589 | A | * | 6/1945 | Slack et al. ................... 440/112 |
| 5,643,025 | A | * | 7/1997 | Suzuki ............................ 440/75 |
| 6,335,580 | B1 | * | 1/2002 | Cognigni et al. ............... 310/89 |
| 8,511,193 | B2 | * | 8/2013 | Yamamoto et al. ............. 74/423 |

FOREIGN PATENT DOCUMENTS

| JP | 36-021704 | | 8/1961 |
| JP | 56-055152 | U | 5/1981 |
| JP | 07-190175 | A | 7/1995 |
| JP | 2000-240736 | A | 9/2000 |
| JP | 2006-207828 | A | 8/2006 |
| JP | 2006-213508 | A | 8/2006 |
| JP | 2010-216591 | | 9/2010 |

* cited by examiner

*Primary Examiner* — Edwin A Young
*Assistant Examiner* — Colby M Hansen
(74) *Attorney, Agent, or Firm* — Squire Patton Boggs (US) LLP (57) ABSTRACT

A speed reduction device includes front and rear stage speed reduction mechanisms. The speed reduction device includes a connecting shaft that connects the front stage speed reduction mechanism to the rear stage speed reduction mechanism; bearings that support the connecting shaft; an oil supply port that is formed on one side of front and rear stage sides of the bearings; and communication passages that make a receiving section, which is closer to the front stage speed reduction mechanism than the bearings in a casing of the speed reduction device, communicate with a receiving section, which is closer to the rear stage speed reduction mechanism than the bearings.

5 Claims, 7 Drawing Sheets

PRIOR ART

US 8,858,380 B2

SPEED REDUCTION DEVICE AND SERIES OF SPEED REDUCTION DEVICES

BACKGROUND

1. Technical Field

The present invention relates to a speed reduction device that includes a front stage speed reduction mechanism and a rear stage speed reduction mechanism, and a series of speed reduction devices.

Priority is claimed to Japanese Patent Application No. 2011-058444, filed on Mar. 16, 2011, the entire content of each of which is incorporated herein by reference.

2. Description of the Related Art

Figure 7:
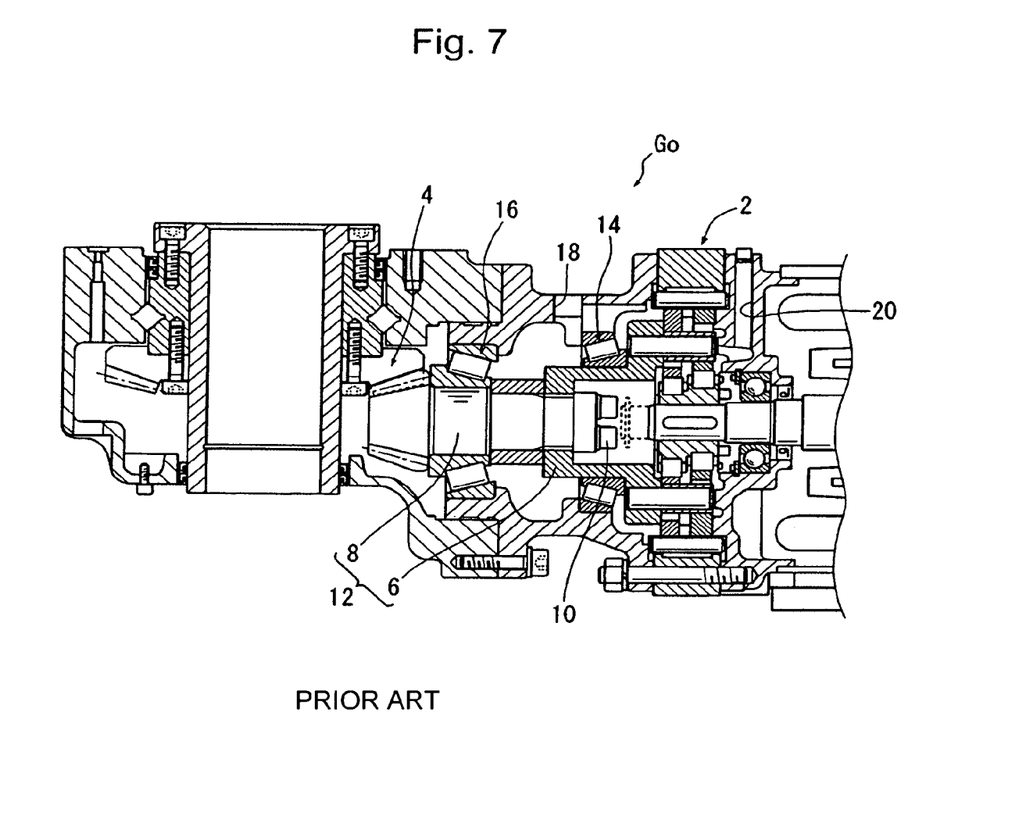
FIG. 7 is a sectional view showing that a speed reduction device in the prior art is used in a mode where the speed reduction device in the prior art is mounted horizontally.

A speed reduction device shown in FIG. 7 is disclosed in the prior art. The speed reduction device Go includes an oscillating internally meshing type planetary gear train 2 as a front stage speed reduction mechanism and a bevel speed reduction mechanism 4 as a rear stage speed reduction mechanism. The speed reduction device Go is used in a so-called "horizontal" mounting mode where the planetary gear train 2 of a front stage and the bevel speed reduction mechanism 4 of a rear stage are disposed side by side in a horizontal direction.

An output shaft 6 of the planetary gear train 2 of the front stage and a pinion shaft 8, which is an input shaft of the bevel speed reduction mechanism 4 of the rear stage, are integrated with each other by bolts 10. A connected body (connecting shaft) 12, which is formed by the integration of the output shaft 6 and the pinion shaft 8, is supported by a pair of bearings 14 and 16.

In the speed reduction device Go, an oil supply port 18 is disposed between the pair of bearings 14 and 16. Oil is injected from the oil supply port 18 to the planetary gear train 2 of the front stage over the front stage side bearing 14 and oil is injected to the bevel speed reduction mechanism 4 of the rear stage over the rear stage side bearing 16. When oil is injected, as much air is vented through an air vent hole 20 as the volume of oil so that oil can be smoothly supplied.

SUMMARY

According to an embodiment of the present invention, there is provided a speed reduction device that includes front and rear stage speed reduction mechanisms. The speed reduction device includes a connecting shaft that connects the front stage speed reduction mechanism to the rear stage speed reduction mechanism, bearings that support the connecting shaft, an oil supply port that is formed on one side of front and rear stage sides of the bearings, and communication passages that make a receiving section, which is closer to the front stage speed reduction mechanism than the bearings in a casing of the speed reduction device, communicate with a receiving section, which is closer to the rear stage speed reduction mechanism than the bearings.

DETAILED DESCRIPTION

However, the speed reduction device is not always used as a speed reduction device of a "horizontal" mounting mode, and may be used as a speed reduction device of a so-called "vertical" mounting mode where the planetary gear train of the front stage and the bevel speed reduction mechanism of the rear stage are disposed so that the planetary gear train of the front stage is positioned on the upper side and the bevel speed reduction mechanism of the rear stage is positioned on the lower side in the vertical direction.

When the connecting shaft, which connects the front stage speed reduction mechanism to the rear stage speed reduction mechanism, is supported by "bearings", oil should be injected while being moved over the gap between the bearings in order to inject oil to a space of the speed reduction mechanism that is positioned on the side where an oil supply port is not formed. This circumstance is the same in the case of not only a horizontal mounting mode but also a vertical mounting mode. Despite this, it is considered that a problem becomes conspicuous in the case of the vertical mounting mode due to the following cause. That is, when the speed reduction device is used "while being mounted horizontally" as in the prior art and the axial direction of the bearings becomes a horizontal direction, oil can move to an adjacent space through a gap (between rolling bodies) of a portion positioned below the bearings themselves in the vertical direction and air can freely flow through a gap of a portion positioned above the bearings themselves in the vertical direction. However, the axial direction of the bearings is close to a vertical direction in the speed reduction device that is mounted in a mode where the front and rear stage speed reduction mechanisms are disposed so that one of the front and rear stage speed reduction mechanisms is positioned on the upper side and the other thereof is positioned on the lower side in the vertical direction. Accordingly, it is speculated that it is difficult for air to be vented through the gap between the rolling bodies of the bearing if an oil film is formed in a gap between the rolling bodies of the bearing once.

With being focused on the injection mechanism of oil, the embodiment of the invention solves this problem by forming the communication passages that connect the receiving section close to the front stage speed reduction mechanism to the receiving section close to the rear stage speed reduction mechanism. Particularly, air can very smoothly move through the communication passages when oil is injected over the bearings. In fact, it is confirmed that it is possible to considerably reduce oil injection time by forming the communication passages when the speed reduction device is mounted vertically.

The communication passages themselves do not become an obstacle when the speed reduction device is mounted horizontally, and allows oil to move more smoothly. Accordingly, the communication passages contribute to reducing oil injection time even when the speed reduction device is mounted horizontally.

Meanwhile, when the embodiment of the invention is considered from a different viewpoint from the side of a manufacturer, the invention may have a large advantage in terms of providing (a series of) speed reduction devices, which can be used without an obstacle while being mounted horizontally and vertically, at a low cost (to be described in detail below).

According to the embodiment of the invention, oil can be very smoothly injected even when the speed reduction device is used while being mounted horizontally and vertically.

When the speed reduction device is used in the mode where the speed reduction device is mounted vertically, oil is injected up to the planetary gear train of the front stage positioned on the upper side. Accordingly, the amount of oil to be injected is increased (as compared to when the speed reduction device is used in the mode where the speed reduction device is mounted horizontally). For this reason, oil injection time is lengthened by that much, but more time tends to be actually taken above the increase of the amount of oil to be injected.

The embodiment of the invention has been made by the countermeasure that is obtained through the study and analysis of the cause, and it is desirable to smoothly inject oil to a speed reduction device including front and rear stage speed reduction mechanisms even though the speed reduction device is used in modes where the speed reduction device is mounted horizontally or vertically.

A speed reduction device according to an example of an embodiment of the invention will be described in detail below with reference to the drawings. The upper side in the respective drawings corresponds to the "upper side" in a vertical direction when a speed reduction device is actually mounted, and the lower side in the respective drawings corresponds to the "lower side" in the vertical direction when the speed reduction device is actually mounted. Meanwhile, the "vertical direction" means a direction toward the center of gravity of the earth.

Figure 1:
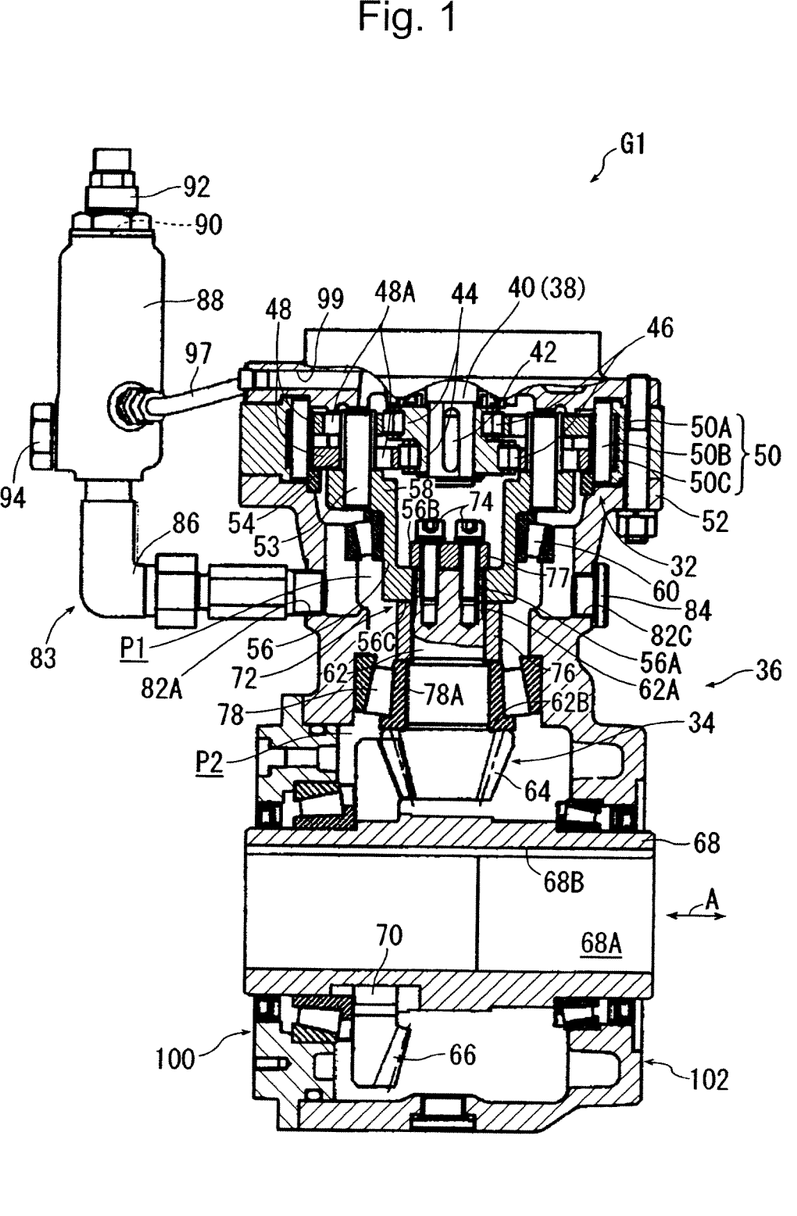
FIG. 1 is a sectional view including the longitudinal section of an output shaft of a speed reduction device that shows an example of an embodiment of the invention.
Figure 2:
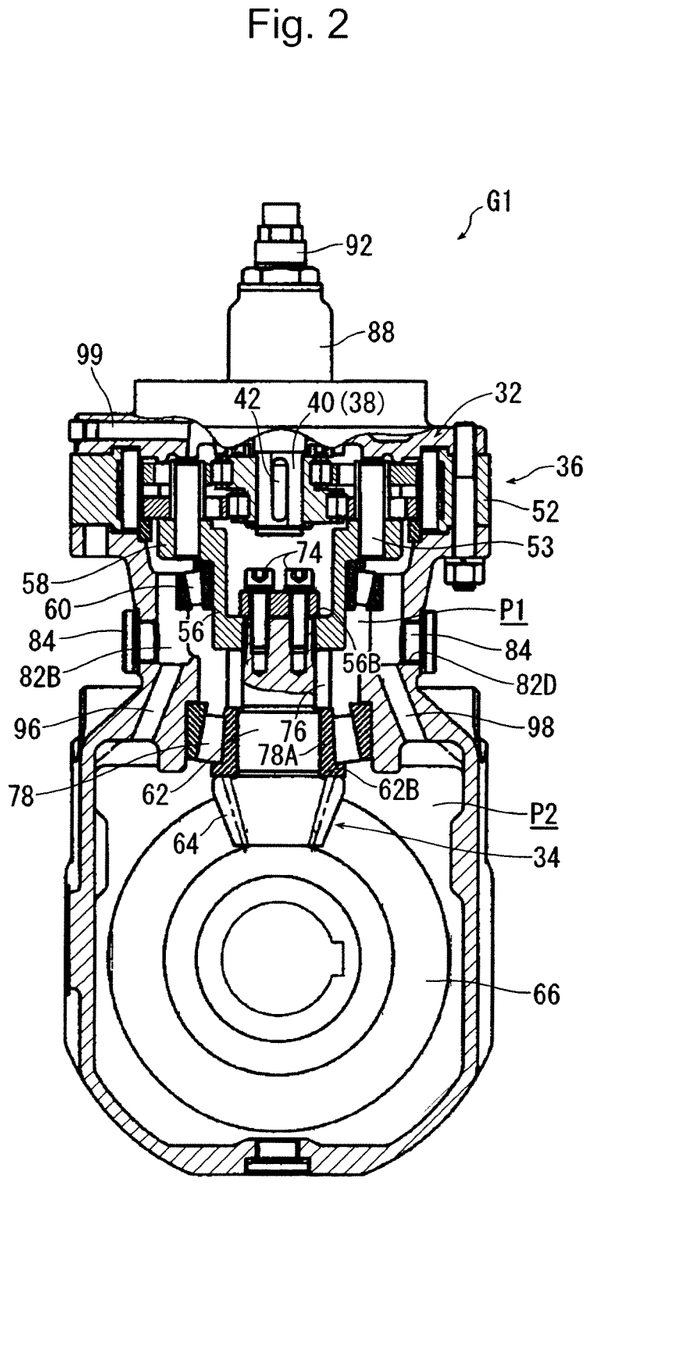
FIG. 2 is a sectional view including the cross-section of the output shaft of the speed reduction device.
Figure 3:
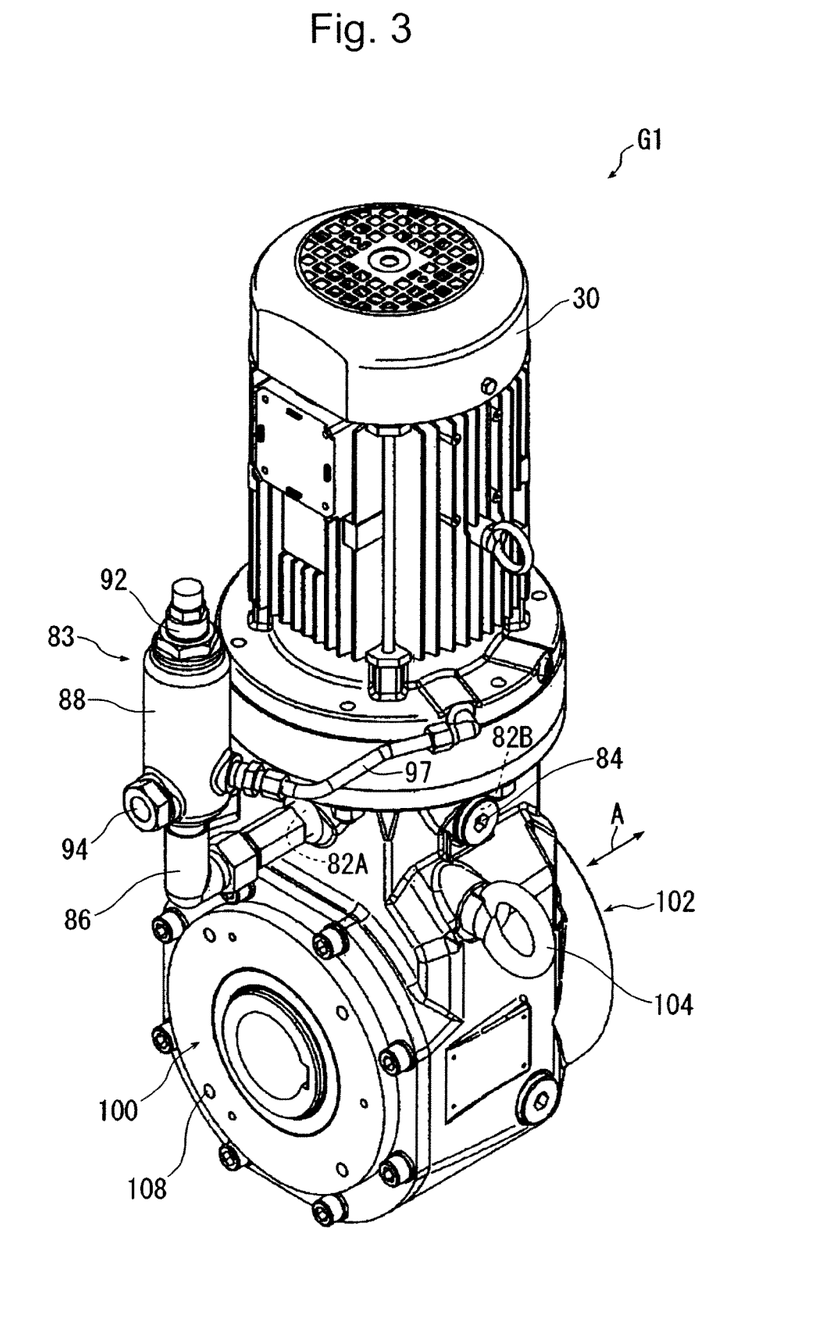
FIG. 3 is a perspective view of the speed reduction device.

FIG. 1 is a sectional view including the longitudinal section of an output shaft of a speed reduction device that shows an example of an embodiment of the invention, FIG. 2 is a sectional view including the cross-section of the output shaft of the speed reduction device, and FIG. 3 is a perspective view of the speed reduction device. Meanwhile, a motor is not shown in FIGS. 1 and 2.

This speed reduction device G1 mainly includes a motor (see FIG. 3) 30 and a speed reducer 36 that includes two stage speed reduction mechanisms, that is, a front stage speed reduction mechanism 32 and a rear stage speed reduction mechanism 34. The motor 30, the front stage speed reduction mechanism 32, and the rear stage speed reduction mechanism 34 are disposed so as to be stacked in this order from the upper side to the lower side. Accordingly, the speed reduction device G1 is used in a mode where the speed reduction device is mounted vertically.

Mainly referring to FIG. 1, the front stage speed reduction mechanism 32 of the speed reducer 36 is a speed reduction mechanism that is called an oscillating internally meshing type.

An output shaft (motor shaft) 38 of the motor 30 also functions as an input shaft (hereinafter, referred to as a front stage input shaft) 40 of the front stage speed reduction mechanism 32. Two eccentric bodies 44 are integrally mounted on the front stage input shaft 40 by a key 42. Externally toothed gears 48 are assembled with the eccentric bodies 44 with rollers 46 interposed therebetween, respectively, so as to freely oscillate and rotate. The phases of the oscillation of the respective externally toothed gears 48 are shifted from each other by an angle of 180°, but the movements of the respective externally toothed gears 48 are the same each other. The respective externally toothed gears 48 mesh with the inner portion of an internally toothed gear 50. The internally toothed gear 50 includes a main body 50A that is integrated with a casing 52, and outer pins 50B and outer rollers 50C that form internal teeth. In this embodiment, the number of external teeth of the externally toothed gear 48 is smaller than the number of internal teeth of the internally toothed gear 50 (the number of the outer pins 50B and the outer rollers 50C) by one. A through hole 48A is formed at each of the externally toothed gears 48, and inner pins 53 and inner rollers 54 pass through the through holes 48A with a gap. The inner rollers 54 are rotatably assembled around the inner pins 53, and the inner pins 53 are press-fitted to a carrier flange 58. The carrier flange 58 is integrated with an output shaft (front stage output shaft) 56 of the front stage speed reduction mechanism 32. The front stage output shaft 56 is hollow and supported by a first tapered roller bearing 60. An inner spline 56A is formed on the inner periphery of an end portion of the front stage output shaft 56.

An input shaft (rear stage input shaft) 62 of the rear stage speed reduction mechanism 34 of the speed reducer 36 includes an outer spline 62A that meshes with the inner spline 56A of the front stage output shaft 56. A bevel pinion 64 is directly formed at an end of the rear stage input shaft 62 by gear cutting. The bevel pinion 64 meshes with a bevel gear 66. The bevel gear 66 is integrated with an output shaft (rear stage output shaft) 68 of the rear stage speed reduction mechanism 34 by a key 70. The rear stage output shaft 68 is formed of a hollow shaft including a hollow portion 68A, and a mating machine shaft (an object to be driven), which is not shown, is inserted into the hollow portion 68A. The mating machine shaft is integrated with the rear stage output shaft 68 by a key (not shown) that is fitted into a key groove 68B.

The front and rear stage output shafts 56 and 62 are integrated with each other in the circumferential direction and the axial direction, and form a connecting shaft 72 that connects the front stage speed reduction mechanism 32 to the rear stage speed reduction mechanism 34. The front and rear stage output shafts 56 and 62 are integrated with each other in the circumferential direction by the meshing of the inner and outer splines 56A and 62A. Meanwhile, the front and rear stage output shafts 56 and 62 are integrated with each other by the tightening of bolts 74. That is, a stepped portion 56B is formed on the inner periphery of the front stage output shaft 56 so as to be adjacent to the inner spline 56A. The stepped portion 56B restricts a block body 77 from moving relative to the front stage output shaft 56 toward the load side in the axial direction. Further, a stepped portion 62B is formed at the rear stage input shaft 62 so as to be adjacent to the bevel pinion 64. The stepped portion 62B restricts the rear stage input shaft 62 from moving relative to the front stage output shaft 56 toward the anti-load side in the axial direction with a spacer 76 and an inner race 78A of a second tapered roller bearing 78, which will be described below, interposed therebetween.

Due to this structure, when the bolts 74 is tightened into the anti-load side end face of the rear stage input shaft 62 with the block body 77 interposed therebetween, the block body 77 and the rear stage input shaft 62 are drawn to each other. Accordingly, the block body 77 is pressed against the stepped portion 56B of the front stage output shaft 56, and the rear stage input shaft 62 is pressed against an anti-load side end face 56C of the front stage output shaft 56 with the spacer 76 and the inner race 78A of the second tapered roller bearing 78 interposed therebetween. As a result, the rear stage input shaft 62 is fixed so as not to be capable of moving relative to the front stage output shaft 56 in the axial direction.

The connecting shaft 72, which is formed through the integration of the front stage output shaft 56 and the rear stage input shaft 62 in this structure, is rotatably supported on the casing 52 of the speed reducer 36 by the pair of first and second tapered roller bearings 60 and 78. The second tapered roller bearing 78, which corresponds to the load side, of these tapered roller bearings corresponds to a bearing, which supports the connecting shaft, of the embodiment of the invention.

In the speed reduction device, a total of four through holes, that is, first to fourth through holes 82A to 82D capable of being used as an oil supply port are formed on the same circumferential surface at an interval of 90° (the first and third through holes 82A and 82C are shown in FIG. 1 and the second and fourth through holes 82B and 82D are shown in FIG. 2) between the first and second tapered roller bearings 60 and 78 (on the side closer to the front stage than the second tapered roller bearing 78 that supports the connecting shaft 72 on the load side) that support the connecting shaft 72.

In this embodiment, the first through hole 82A, which is shown on the left side in FIG. 1, among the first to fourth through holes 82A to 82D is actually used as an oil supply port. An oil supply assembly 83 is mounted on the first through hole 82A, which is actually used as an oil supply port, as a mounting part. The oil supply assembly 83 includes an L-shape pipe 86 that is mounted on the first through hole 82A, a large-diameter pipe 88 that is connected to the L-shape pipe 86 and includes an air reservoir (not shown) therein, an air breather 92 that is disposed at the upper portion of the large-diameter pipe 88, an oil gauge 94 that checks the amount of injected oil (oil having been injected), and the like as one set. During the supply of oil, oil is injected from an opening 90 that is exposed to the outside when the air breather 92 is separated. The oil gauge 94 is mounted on the lower portion of the large-diameter pipe 88, and the oil of the speed reducer 36 is injected up to the mounting position of the oil gauge 94, that is, up to the substantially middle portion of the front stage speed reduction mechanism 32. Meanwhile, a pipe denoted by reference numeral 97 is a pipe that connects an air vent hole 99 to the air reservoir of the large-diameter pipe 88 of the oil supply assembly 83. That is, the oil supply assembly 83 also functions as a release place of oil when internal pressure rises during the operation.

Since the other three through holes, that is, the second to fourth through holes 82B to 82D are not used as the oil supply port in this embodiment, blocking plugs 84 are screwed to the second to fourth through holes 82B to 82D. Meanwhile, all the first to fourth through holes 82A to 82D have not only the same diameter but also the same structure. Accordingly, mounting parts, such as the oil supply assembly 83 and the blocking plugs 84 mounted on the first to fourth through holes 82A to 82D, have interchangeability when being mounted on all the first to fourth through holes 82A to 82D.

As shown in FIG. 2, first and second communication passages 96 and 98, which make a receiving section P1 communicate with a receiving section P2. The receiving section P1 is closer to the front stage speed reduction mechanism 32 than the second tapered roller bearing 78. The receiving section P2 is closer to the rear stage speed reduction mechanism 34 than the second tapered roller bearing 78.

In the embodiment shown in FIG. 2, two communication passages, that is, the first and second communication passages 96 and 98 are formed between the second tapered roller bearing 78 and two side surfaces parallel to the rear stage output shaft 68, respectively. Since the cross-section of the casing 52 of this embodiment has a rectangular shape close to a square shape, it is possible to form the communication passages having a large diameter without reducing strength according to this position. However, only one communication passage may be formed. In contrast, three or more (for example, four) communication passages may be formed. The position where the communication passage is formed may also be set to an arbitrary position in consideration of the shape of the casing.

The casing 52 of the speed reducer 36 includes two surfaces 100 and 102, that is, an end cover surface 100 and a mating machine surface 102, which are perpendicular to the rear stage output shaft 68, around the rear stage output shaft 68. In this embodiment, the surface (the left surface in FIG. 1) where the first through hole 82A actually used as an oil supply port is formed is the end cover surface 100 and the surface (the right surface in FIG. 1) opposite to the end cover surface is the mating machine surface 102 (a mating machine (not shown) is mounted on the position and in the direction that are shown by a two-way arrow A).

Meanwhile, reference numerals 104 and 106 denote eye bolts that are used to hang the speed reducer 36, reference numeral 108 denotes mounting bolt holes for a safety cover (not shown), and reference numeral 111 denotes bolt holes that are connected to a mating machine (not shown).

Next, the operation of the speed reduction device will be described.

When the motor 30 is driven and the front stage input shaft 40 integrated with the motor shaft 38 rotates, the externally toothed gears 48 oscillate and rotate while meshing with the internally toothed gear 50 with the eccentric bodies and the rollers 46 interposed therebetween. In this embodiment, the main body 50A of the internally toothed gear 50 is integrated (fixed to) with the casing 52 and the number of the external teeth of the externally toothed gear 48 is smaller than the number of the internal teeth of the internally toothed gear 50 (the number of the outer pins 50B and the outer rollers 50C) by one. For this reason, the externally toothed gear 48 slowly rotates by an angle corresponding to one tooth of the externally toothed gear 48 whenever oscillating one time. The rotation component of the externally toothed gear 48 is transmitted to the carrier flange 58 through the inner rollers 54 and the inner pins 53. Meanwhile, the oscillation component of the externally toothed gear 48 is absorbed by a gap between the inner roller 54 and the through hole 48A of the externally toothed gear 48. As a result, the rotation of the front stage input shaft 40 is significantly decelerated to the speed of "1/the number of the teeth of the externally toothed gear 48", so that the front stage output shaft 56 (the connecting shaft 72) integrated with the carrier flange 58 rotates at a reduced low rotational speed. Therefore, when the rear stage input shaft 62 integrated with the front stage output shaft 56 rotates, the bevel pinion 64 formed at the end of the rear stage input shaft 62 rotates and the bevel gear 66 meshing with the bevel pinion 64 rotates while being decelerated. When the bevel gear 66 rotates, the rear stage output shaft 68 connected to the bevel gear 66 by the key 70 rotates. Accordingly, the mating machine shaft (not shown), which is inserted and connected to the hollow portion 68A of the rear stage output shaft 68, is driven.

Here, the modes where the speed reduction device G1 is mounted and the operations related to the first to fourth through holes 82A to 82D, which can be used as the oil supply port, will be described in detail.

In this embodiment, in order to use the speed reduction device G1 in a mode where the speed reduction device G1 is mounted vertically, only the first through hole 82A among the four through holes, that is, the first to fourth through holes 82A to 82D capable of being used as the oil supply port is actually used as an oil supply port and the oil supply assembly 83 where the oil gauge 94, the air breather 92, and the like are combined is mounted on the first through hole 82A as a mounting part. The blocking plugs 84 are mounted on the other three through holes, that is, the second to fourth through holes 82B to 82D.

In order to inject oil to the speed reduction device G1 that is mounted vertically, the air breather 92 of the oil supply assembly 83 is separated and oil is injected from the opening 90 that is formed at the upper portion of the large-diameter pipe 88 of the oil supply assembly 83 and is exposed to the outside. The injected oil is injected to the receiving section P1 (closer to the front stage speed reduction mechanism 32 than the second tapered roller bearing 78) of the speed reducer 36 from the first through hole 82A (that is used as an oil supply port) through the L-shape pipe 86 that is connected to the lower portion of the large-diameter pipe 88. The injected oil flows down to the receiving section P2, which is close to the rear stage speed reduction mechanism 34, from a gap of the second tapered roller bearing 78 as in the prior art. However, in this embodiment, the injected oil directly flows down to the receiving section P2, which is close to the rear stage speed reduction mechanism 34, through the first and second communication passages 96 and 98 at the same time.

Meanwhile, the first and second communication passages 96 and 98 function as air vent passages of the receiving section P2 close to the rear stage speed reduction mechanism 34, and can effectively release the air of the receiving section P2, which is close to the rear stage speed reduction mechanism 34, to the upper portion of the second tapered roller bearing 78. When oil is injected, air can be vented through the air vent hole 99 and the pipe 97.

Eventually, when the injection level of oil approaches the substantially middle portion of the front stage speed reduction mechanism 32, the injection level appears at the oil gauge 94. Accordingly, the injection of oil is stopped at the time where it can be confirmed that the injection level, which gradually rises, becomes a predetermined height. After that, the air breather 92 is mounted again, and an injection work is completed. Accordingly, it is possible to considerably reduce the time of the injection work as compared to the prior art.

Further, unlike the structure where an oil supply port communicating with the outside of the casing 52 is newly formed, the structure where the first and second communication passages 96 and 98 are formed is excellent in that the increase of manufacturing costs is relatively small, the number of parts such as blocking plugs is not increased, and there is no concern that a problem of oil leakage is caused.

Meanwhile, an example where the speed reduction device G1 is used in the mode where the speed reduction device G1 is mounted vertically has been described in the above-mentioned embodiment. However, the speed reduction device G1 according to the embodiment of the invention may be used in various mounting modes.

Figure 4A:
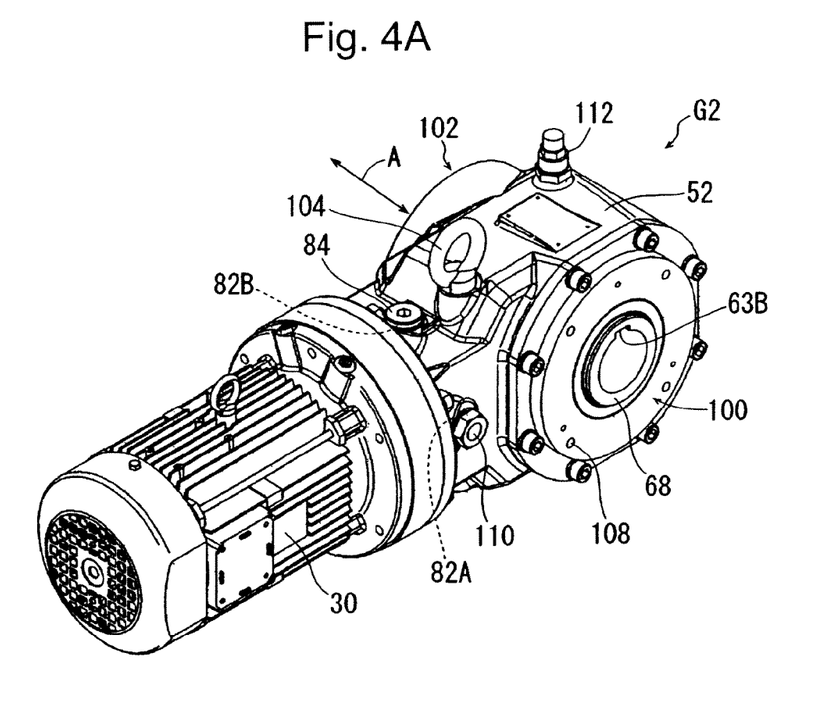
FIG. 4A is a perspective view showing that the speed reduction device is used in a mode where the speed reduction device is mounted horizontally when a mating machine is positioned on one side of the speed reduction device in a horizontal direction.
Figure 4B:
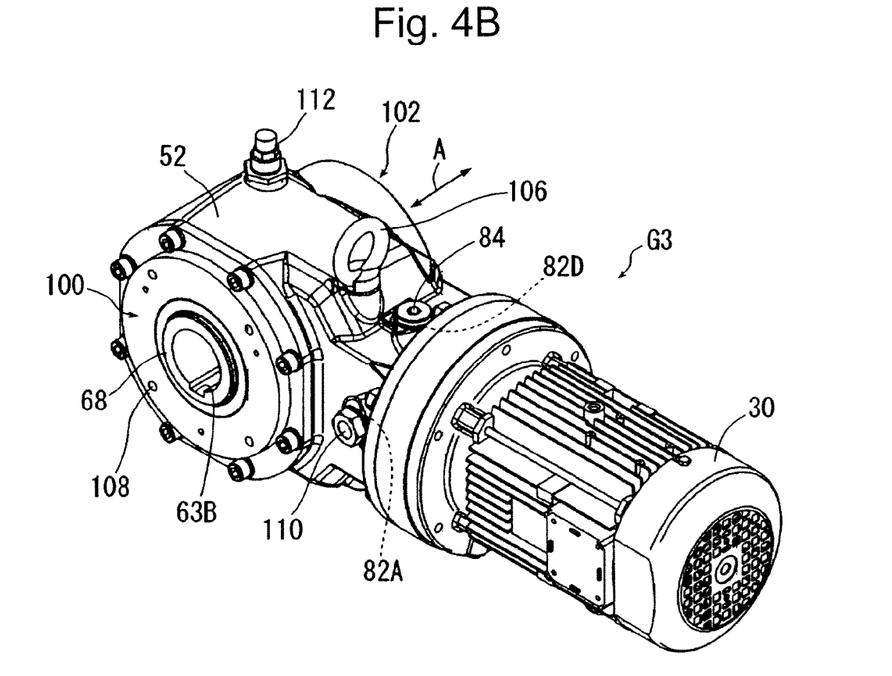
FIG. 4B is a perspective view showing that the speed reduction device is used in a mode where the speed reduction device is mounted horizontally when the mating machine is positioned on the other side of the speed reduction device in the horizontal direction.

For example, FIGS. 4A and 4B show examples where the speed reduction device G1 is formed as speed reduction devices G2 and G3 of a mode where the speed reduction device G1 is mounted horizontally when a mating machine shaft (not shown), which is an object to be driven, extends in a horizontal direction. A mating machine (not shown) is mounted on the position and in the direction that are shown by a two-way arrow A. Since the mating machine shaft is disposed horizontally, the rear stage output shaft 68 is also disposed horizontally.

When the speed reduction device is formed as the speed reduction device G2 as shown in FIG. 4A, the second through hole 82B, which is positioned at the upper portion, among the first to fourth through holes 82A to 82D capable of being used as the oil supply port is actually used as an oil supply port. A blocking plug 84 is mounted on the second through hole 82B after the injection of oil. In this case, an exclusive oil gauge 110 is mounted on the first through hole 82A (which is used as an oil supply port in the speed reduction device G1), which is positioned on the same side as the end cover surface 100, as a mounting part. Blocking plugs 84 are mounted on the other two through holes, that is, the third and fourth through holes 82C and 82D that can be used as the oil supply port (see FIGS. 1 to 3).

When oil is injected to the speed reduction device G2, which is mounted horizontally as described above, from the second through hole 82B used as an oil supply port, the portions below the first and second tapered roller bearings 60 and 78 serves as oil passages, the portions above the first and second tapered roller bearings 60 and 78 serves as air passages, the second communication passage 98 positioned at the lower portion serves as an oil passage, and the first communication passage 96 positioned at the upper portion serves as an air vent passage. Accordingly, oil passages and air passages have been expanded as compared to the prior art. As a result, even in this case, it is possible to inject oil at a speed that is equal to or higher than the speed in the prior art. Meanwhile, an air breather 112 has been mounted on the upper portion of the casing 52 in the speed reduction device G2, but may be provided at the second through hole 82B that is actually used as an oil supply port.

When the speed reduction device is formed as the speed reduction device G3 as shown in FIG. 4B, the fourth through hole 82D, which is positioned at the upper portion, is used as an oil supply port. A blocking plug 84 is mounted on the fourth through hole 82D after the injection of oil. An exclusive oil gauge 110 is mounted on the first through hole 82A (which is used as an oil supply port in the speed reduction device G1), which is positioned on the same side as the end cover surface 100, as a mounting part. The speed reduction device G3 of FIG. 4B corresponds to a state where the speed reducer 36 and the motor 30 of the speed reduction device G2 of FIG. 4A are reversed in a vertical direction. Accordingly, the speed reduction device G3 can perform completely the same injection work of the injection work of the speed reduction device G2. Meanwhile, even in the speed reduction device G3, the air breather 112 may be provided at the fourth through hole 82D that is actually used as an oil supply port.

Figure 5A:
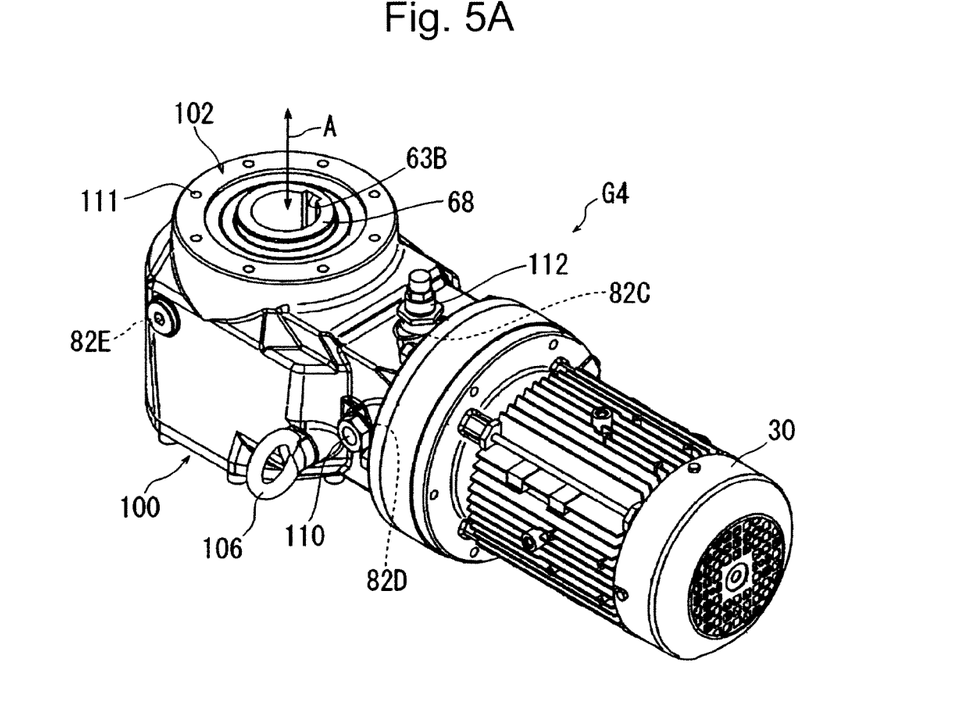
FIG. 5A is a perspective view showing that the speed reduction device is used in a mode where the speed reduction device is mounted horizontally when a mating machine is positioned on the upper side of the speed reduction device in a vertical direction.
Figure 5B:
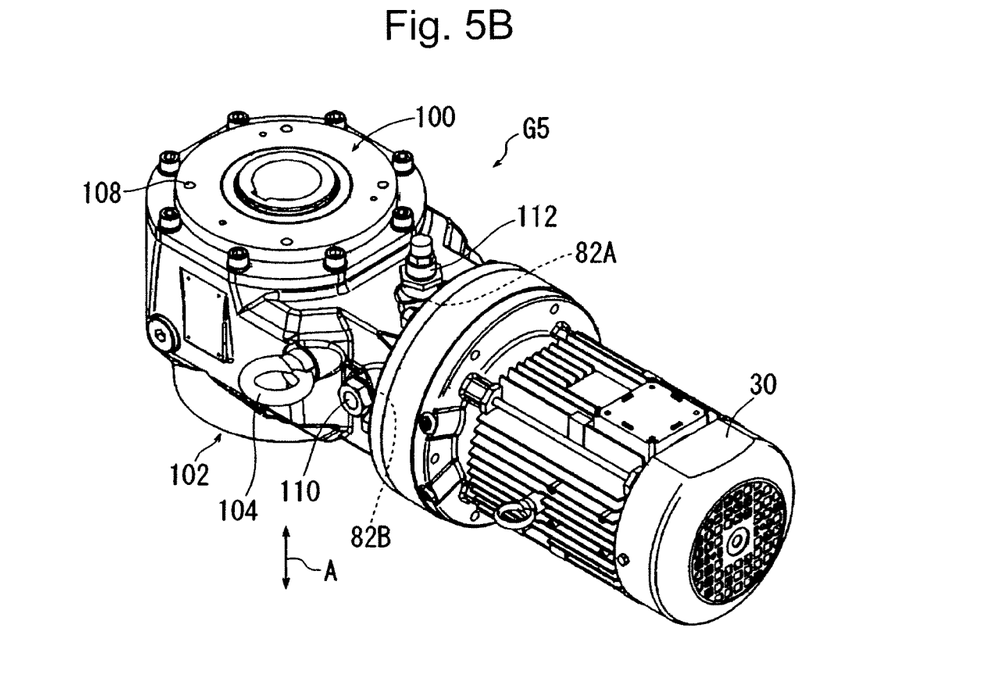
FIG. 5B is a perspective view showing that the speed reduction device is used in a mode where the speed reduction device is mounted horizontally when the mating machine is positioned on the lower side of the speed reduction device in the vertical direction.

In addition, FIGS. 5A and 5B show examples where the speed reduction device G1 is formed as speed reduction devices G4 and G5 of a mode where the speed reduction device G1 is mounted horizontally when a mating machine shaft, which is an object to be driven, extends in a horizontal direction. A mating machine (not shown) is mounted on the position and in the direction that are shown by a two-way arrow A. Since the mating machine shaft is disposed vertically, the rear stage output shaft 68 is also disposed vertically.

When the speed reduction device is formed as the speed reduction device G4 as shown in FIG. 5A, the third through hole 82C, which is positioned at the upper portion, among the first to fourth through holes 82A to 82D capable of being used as the oil supply port is actually used as an oil supply port. An exclusive air breather 112 is mounted on the third through hole 82C after the injection of oil.

In this case, an exclusive oil gauge 110 is mounted on the fourth through hole 82D as a mounting part. Blocking plugs 84 are mounted on the other two through holes, that is, the first and second through holes 82A and 82B (that can be used as the oil supply port).

The fourth through hole 82D is the same as the above-mentioned speed reduction devices G2 and G3 of FIGS. 4A and 4B in that gaps of portions positioned below the first and second tapered roller bearings 60 and 78 themselves in the vertical direction serves as oil passages and gaps of portions positioned above the first and second tapered roller bearings 60 and 78 themselves serves as air passages when oils is injected to the speed reduction device G4, which is mounted in this mode, from the third through hole 82C that is used as an oil supply port (or the fifth through hole denoted by reference numeral 82E of FIG. 5A may be used as an oil supply port). However, the first and second communication passages 96 and 98 also have functions depending on the injection level of oil. Specifically, when the heights of the first and second communication passages 96 and 98 are higher than the injection level of oil, the first and second communication passages 96 and 98 function as air vent passages. When the heights of the first and second communication passages 96 and 98 are lower than the injection level of oil, the first and second communication passages 96 and 98 function as oil passages. Meanwhile, even in this case, oil does not cover the upper portions of the first and second tapered roller bearings 60 and 78 themselves in the vertical direction. Accordingly, it is not difficult to vent air. Even in the speed reduction device G4 of this mounting mode, it is possible to inject oil at a speed that is equal to or higher than the speed in the prior art.

When the speed reduction device is formed as the speed reduction device G5 as shown in FIG. 5B, the first through hole 82A, which is positioned at the upper portion, is used as an oil supply port. An exclusive air breather 112 is mounted on the first through hole 82A after the injection of oil. An exclusive oil gauge 110 is mounted on the second through hole 82B as a mounting part. Blocking plugs 84 are mounted on the other two through holes, that is, the third and fourth through holes 82C and 82D (that can be used as the oil supply port). The speed reduction device G5 of FIG. 5B can also perform completely the same injection work of the injection work of the speed reduction device G4 of FIG. 5A.

Figure 6:
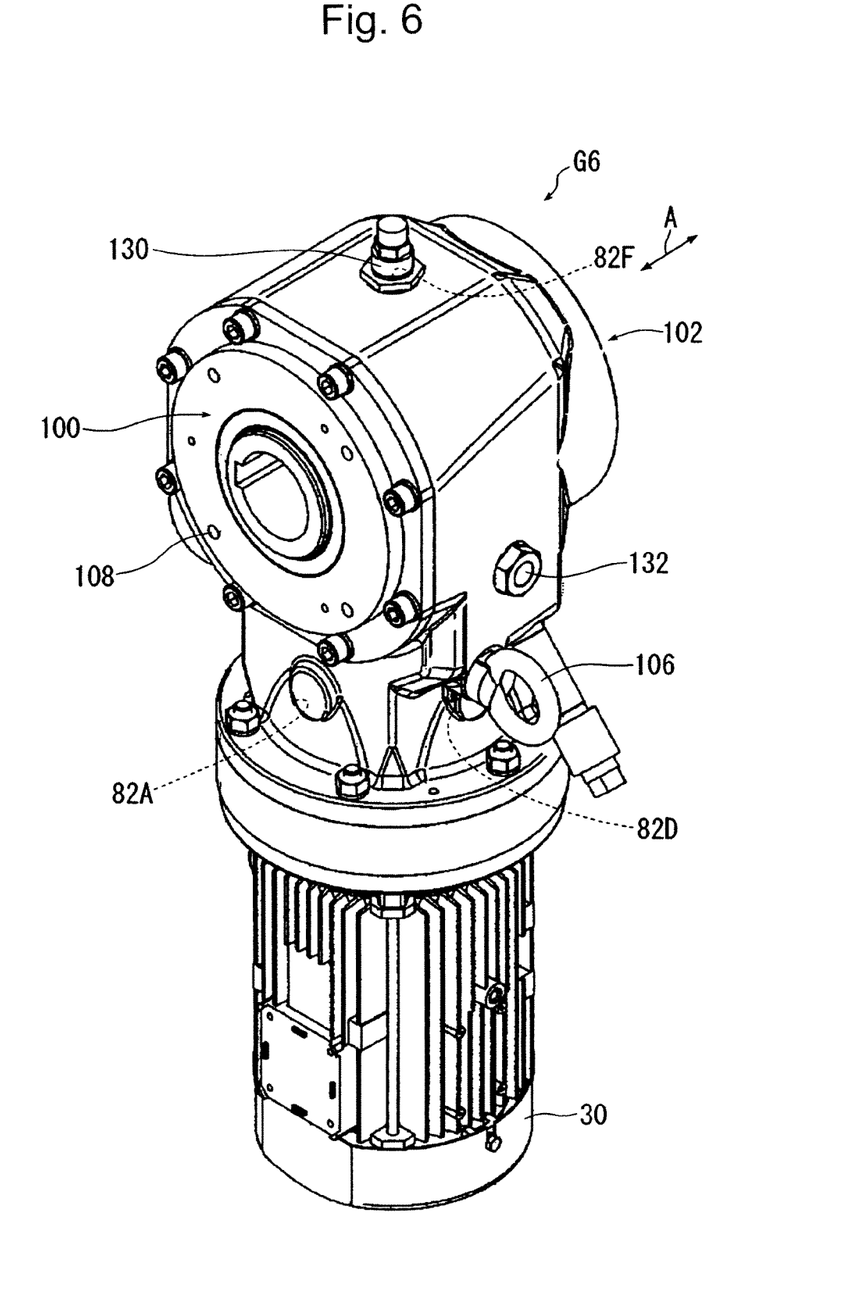
FIG. 6 is a perspective view showing that the speed reduction device is used in another mode where the speed reduction device is mounted vertically.

Moreover, the embodiment of the invention may also be applied to the case where a speed reduction device is reversed to the speed reduction device G1 of FIGS. 1 to 3 in a vertical direction so as to be disposed "vertically" like a speed reduction device G6 of FIG. 6. That is, in the speed reduction device G6, a sixth through hole 82F is formed at a portion of the second tapered roller bearing 78 close to the rear stage speed reduction mechanism 34. Since the sixth through hole 82F is used as an oil supply port and oil is supplied from the sixth through hole 82F, it is possible to very smoothly supply oil to the front stage speed reduction mechanism 32 over the second tapered roller bearing 78 that is in completely the same state as that of the speed reduction device G1 according to the above-mentioned embodiment of FIGS. 1 to 3. An air breather 130 is mounted on the sixth through hole 82F after the supply of oil. Reference numeral 132 denotes an oil gauge.

Meanwhile, when the speed reduction device is mounted in the mode of FIG. 6 and the sixth through hole 82F is used as an oil supply port, it is preferable that a communication passage making the front stage side of the first tapered roller bearing 60 communicate with the rear stage side of the first tapered roller bearing 60 be formed. Further, if the same oil supply assembly (83) as the oil supply assembly of the speed reduction device G1 can be used even in the speed reduction device G6, it is possible to obtain the same advantage as the advantage of the speed reduction device G1 merely by forming the communication passage that makes the front stage side of the first tapered roller bearing 60 communicate with the rear stage side of the first tapered roller bearing 60 by using the first through hole 82A or the fourth through hole 82D (not shown in FIG. 6) (without forming the first and second communication passages 96 and 98 that make the front stage side of the second tapered roller bearing 78 communicate with the rear stage side of the second tapered roller bearing 78.

As described above, according to the above-mentioned embodiment, through only a slight modification of the speed reduction device in the prior art, it is possible to appropriately use the first to fourth through holes 82A to 82D (which can be used as the oil supply port) of the speed reduction device G1 as the oil supply port in a certain case and to use the first to fourth through holes 82A to 82D as through holes where mounting parts, such as the oil gauge 110, the air breather 112, or an oil supply assembly 83 including the oil gauge 94 and the air breather 92, are mounted in a certain case.

Accordingly, even when a speed reduction device is used in the mode where a speed reduction device is mounted vertically, even when a speed reduction device is used in the mode where the speed reduction device is mounted horizontally, and even when a mating machine shaft is present on any side of the speed reduction device, it is possible to use a speed reduction device as the speed reduction device G1 that obtains a very excellent advantage of reducing oil injection time.

When the embodiment of the invention is considered from a different viewpoint from the side of a manufacturer that needs to provide a speed reduction device used in a mode where the speed reduction device is mounted vertically and a speed reduction device used in a mode where the speed reduction device is mounted horizontally, the embodiment of the invention provides a "series of speed reduction devices (a series of the speed reduction device G1 and any one of the speed reduction devices G2 to G5)". The series of speed reduction devices include a first speed reduction device (the speed reduction device G1 in the disclosed examples) that can be mounted in a specific mounting mode and a second speed reduction device (any one of the speed reduction devices G2 to G5) that can be mounted in a mounting mode different from the specific mounting mode. Each of the first speed reduction device (the speed reduction device G1) and the second speed reduction device (any one of the speed reduction devices G2 to G5) includes the front stage speed reduction mechanism (32), the rear stage speed reduction mechanism (34), the connecting shaft (72), and the bearing (78). In the first speed reduction device (the speed reduction device G1) and the second speed reduction device (any one of the speed reduction devices G2 to G5), the mounting parts (83, 84, 110, and 112) mounted on the common through holes (82A to 82D) capable of being used as the oil supply port include different through holes (82A to 82D) and the above-mentioned communication passages (96 and 98) are formed in at least the first speed reduction device (speed reduction device G1).

When the speed reduction device is provided as a "component of the series", the communication passages may be formed at all the speed reduction devices of the series or the communication passage may be formed at only a part of the speed reduction devices of the series in consideration of a ratio of components that are used while being mounted vertically. When the communication passages are formed at all the speed reduction devices of the series, all the speed reduction devices may be formed of "speed reduction devices having the same structure". Accordingly, it is easy to manage inventory and it is possible to provide all the speed reduction devices of the series to a user as "speed reduction devices that can be used while being mounted vertically and horizontally". Meanwhile, when the communication passages are formed at only a part (including at least the vertically-mounted speed reduction device G1) of the speed reduction devices of the series, it is possible to provide the "exclusive mounted speed reduction device that can be used while being mounted horizontally" and the "speed reduction device that can be successfully used while being mounted vertically and horizontally" to a user after differentiating the "exclusive mounted speed reduction device that can be used while being mounted horizontally" and the "speed reduction device that can be successfully used while being mounted vertically and horizontally", while suppressing the increase of the manufacturing costs (including working costs) of the entire series as much as possible.

Meanwhile, when the speed reduction device according to the embodiment of the invention is used in a mode where the speed reduction device is mounted vertically, the most significant advantage of "considerably reducing oil injection time" is obtained. However, as apparent even in the above description, the embodiment of the invention can obtain an advantage of reducing oil injection time as compared to the prior art even when the speed reduction device is used in modes other than the mode where the speed reduction device is mounted vertically.

Further, in the above-mentioned embodiment, two communication passages have been formed between the second tapered roller bearing and two side surfaces parallel to the rear stage output shaft, respectively. However, the communication passages of the embodiment of the invention are not limited thereto, and only one communication passage may be formed or three or more (for example, four) communication passages may be formed. When a plurality of communication passages are formed, it is possible to effectively fulfill a function as communication passages by that much. Meanwhile, even in regard to the positions where the communication passages are formed, the communication passages do not need to be formed between the second tapered roller bearing and two side surfaces parallel to the rear stage output shaft and may be formed at arbitrary positions.

Further, in the above-mentioned embodiment, four through hole capable of being used as the oil supply port have been formed on the same circumferential surface at regular intervals (at an interval of 90°). This structure is excellent in that it is possible to very effectively cope with various mounting modes. However, the number of through holes, which can be used as the oil supply port of the speed reduction device according to the embodiment of the invention, is not limited to four, and may be, for example, three or less or five or more. In regard to the positions where the through holes are formed, all the through holes may not be necessarily formed on the same circumferential surface.

When many through holes capable of being used as the oil supply port are formed, it is possible not only to cope with the modes where the speed reduction device is mounted vertically and horizontally but also to flexibly cope with the interference the mounting position of mounting parts and a mating machine, peripheral areas, or members that much. As a result, particularly, for example, there is a high possibility that this advantage is effective in mounting many mounting parts of a portion protruding from the speed reduction device, such as an "oil supply assembly".

Further, in the embodiment, an oscillating internally meshing type speed reduction mechanism has been employed as the front stage speed reduction mechanism, and an orthogonal speed reduction mechanism including the bevel pinion and the bevel gear has been employed as the rear stage speed reduction mechanism. The front and rear stage speed reduction mechanisms of the embodiment of the invention are not limited to this embodiment. In short, as along as a bearing, which supports the connecting shaft connecting the front stage speed reduction mechanism to the rear stage speed reduction mechanism, is disposed between the front and second stage speed reduction mechanisms, for example, various speed reduction mechanisms, such as a parallel axis gear-speed reduction mechanism, a simple planetary gear speed reduction mechanism, or a hypoid gear speed reduction mechanism may be used.

The bearing, which supports the connecting shaft, is not limited to a tapered roller bearing. Even though the bearing is a bearing such as a ball bearing or a needle bearing, the same advantage as described above is obtained.

Furthermore, the structure where the front and rear stage output shafts are integrated with each other by the bolts has been employed in the embodiment. However, the structure, which connects the front and rear stage speed reduction mechanisms of the embodiment of the invention, is not limited to this structure, and may be, for example, a structure where the front stage output shaft directly functions as the rear stage input shaft. In this case, the front stage output shaft, which functions as the rear stage input shaft, forms the "connecting shaft that connects the front stage speed reduction mechanism to the rear stage speed reduction mechanism" of the embodiment of the invention. Further, for example, a joint shaft, which connects the front stage output shaft to the rear stage input shaft, may be provided. In this case, the front stage output shaft, the rear stage input shaft, and the joint shaft may be provided as the "connecting shaft that connects the front stage speed reduction mechanism to the rear stage speed reduction mechanism".

Moreover, the oil supply port is provided between the pair of bearings in the above-mentioned embodiment, so that the protrusion of the mounting part from the casing has been suppressed as much as possible. However, the position of the oil supply port is not particularly limited. As long as the oil supply port is supplied from one side of the front stage side and the rear stage side of the bearings, which support the connecting shaft connecting the front stage speed reduction mechanism to the rear stage speed reduction mechanism, to the other side over the bearings, the embodiment of the invention may be applied and the same advantage is obtained. For example, the fifth through hole, which is denoted by reference numeral 82E of FIG. 5A, may be used as an oil supply port, and a through hole where the air breather 112 shown in FIG. 4 is mounted may be used as an oil supply port.

The communication passage may also be opened to the further front stage side of the first tapered roller bearing 60 (the receiving section P1 of the front stage speed reduction mechanism 32) without being opened between the first and second tapered roller bearings 60 and 78. This structure is particularly preferred in the example of FIG. 6.

Further, in the above-mentioned embodiment, a speed reduction device, which is used in the mode where the front and rear stage speed reduction mechanisms are disposed so that one of the front and rear stage speed reduction mechanisms is positioned on the upper side and the other thereof is positioned on the lower side in the vertical direction, has been referred to as a vertically-mounted speed reduction device; and a speed reduction device, which is used in the mode where the front and rear stage speed reduction mechanisms are disposed side by side in the horizontal direction, has been referred to as a horizontally-mounted speed reduction device. However, the deviation or inclination from the vertical direction or the horizontal direction is also included in the concept of the upper and lower sides or the disposition side by side in the horizontal direction. For example, in the case of vertical mounting, as long as one of the front and rear stage speed reduction mechanisms is positioned on the upper side and the other thereof is positioned on the lower side, for example, the axial direction of the connecting shaft may be deviated from the vertical direction.

It should be understood that the invention is not limited to the above-described embodiment, but may be modified into various forms on the basis of the spirit of the invention. Additionally, the modifications are included in the scope of the invention.

What is claimed is:

1. A speed reduction device that includes front and rear stage speed reduction mechanisms, the speed reduction device comprising:
   a connecting shaft that connects the front stage speed reduction mechanism to the rear stage speed reduction mechanism;
   a first bearing that is configured to support the connecting shaft;
   a second bearing configured to support the connecting shaft on a rear stage mechanism side;
   an oil supply port that is disposed between the first bearing and the second bearing, the oil supply port penetrating a casing of the speed reduction device; and
   a communication passage configured to connect a first receiving section to a second receiving section of the speed reduction device,
   wherein the first receiving section is closer to the front stage speed reduction mechanism than the second bearing in a casing of the speed reduction device,
   wherein the second receiving section is closer to the rear stage speed reduction mechanism than the second bearing, and
   wherein a plurality of through be used as the oil supply port are disposed in the casing between the first bearing and the second bearing, the plurality of through holes having intervals therebetween in the circumferential direction.

2. The speed reduction device according to claim 1,
   wherein when the speed reduction device is oriented in a vertical direction, the front and rear stage speed reduction mechanisms are disposed so that one of the front and rear stage speed reduction mechanisms is positioned on an upper side of the speed reduction device and another thereof is positioned on an opposite lower side of the speed reduction device.

3. A series of speed reduction devices that includes a first speed reduction device configured to be mounted in a first mounting direction and a second speed reduction device configured to be mounted in a second mounting direction different from the first mounting direction,
   wherein each of the first and second speed reduction devices includes a front stage speed reduction mechanism, a rear stage speed reduction mechanism, a connecting shaft that connects the front stage speed reduction mechanism to the rear stage speed reduction mechanism, a first bearing configured to support the connecting shaft, and a second bearing configured to support the connecting shaft on a rear stage mechanism side, and
   wherein in the first and second speed reduction devices, mounting parts mounted on common through holes configured to be used as an oil supply port include different through holes,
   wherein a communication passage is formed in at least the first speed reduction device and configured to connect a first receiving section to a second receiving section of the first speed reduction device,
   wherein the first receiving section is closer to the front stage speed reduction mechanism than the second bearing in a casing of the first speed reduction device,
   wherein the second receiving section is closer to the rear stage speed reduction mechanism than the second bearing, and
   wherein in the casing of the first speed reduction device and in the casing of the second speed reduction device, a plurality of through holes configured to be used as the oil supply port is disposed between the first bearing and the second bearing, the plurality of through holes having intervals therebetween in the circumferential direction.

4. The series of speed reduction devices according to claim 3,
   wherein the mounting parts comprise at least one of an oil gauge, an air breather, and an oil supply assembly.

5. The series of speed reduction devices according to claim 3,
   wherein the first speed reduction device is vertically-mounted, which is used in the first mounting direction where the front and rear stage speed reduction mechanisms are disposed so that one of the front and rear stage speed reduction mechanisms is positioned on the upper side and the other thereof is positioned on the lower side in a vertical direction, and
   wherein the second speed reduction device is horizontally-mounted, which is used in the second mounting direction different from the first mounting direction where the front and rear stage speed reduction mechanisms are disposed side by side in a horizontal direction.

* * * * *